Figure 12:
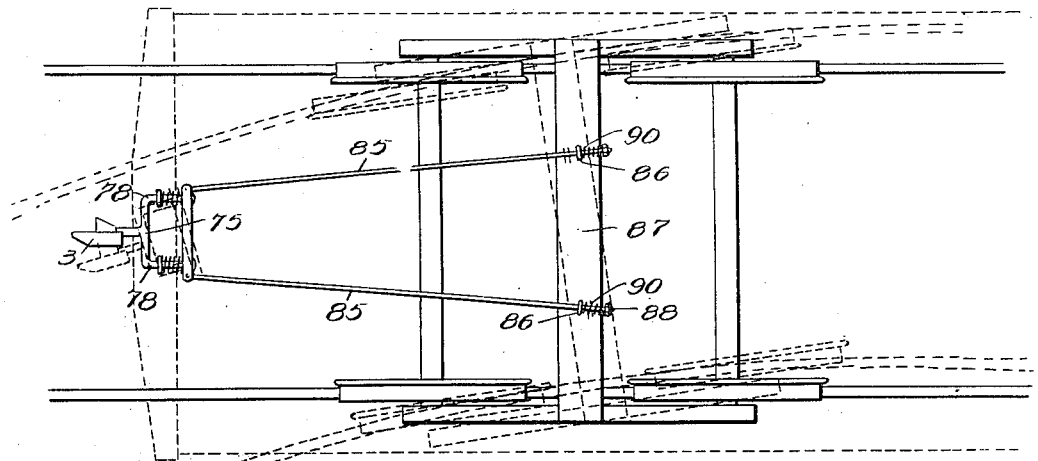

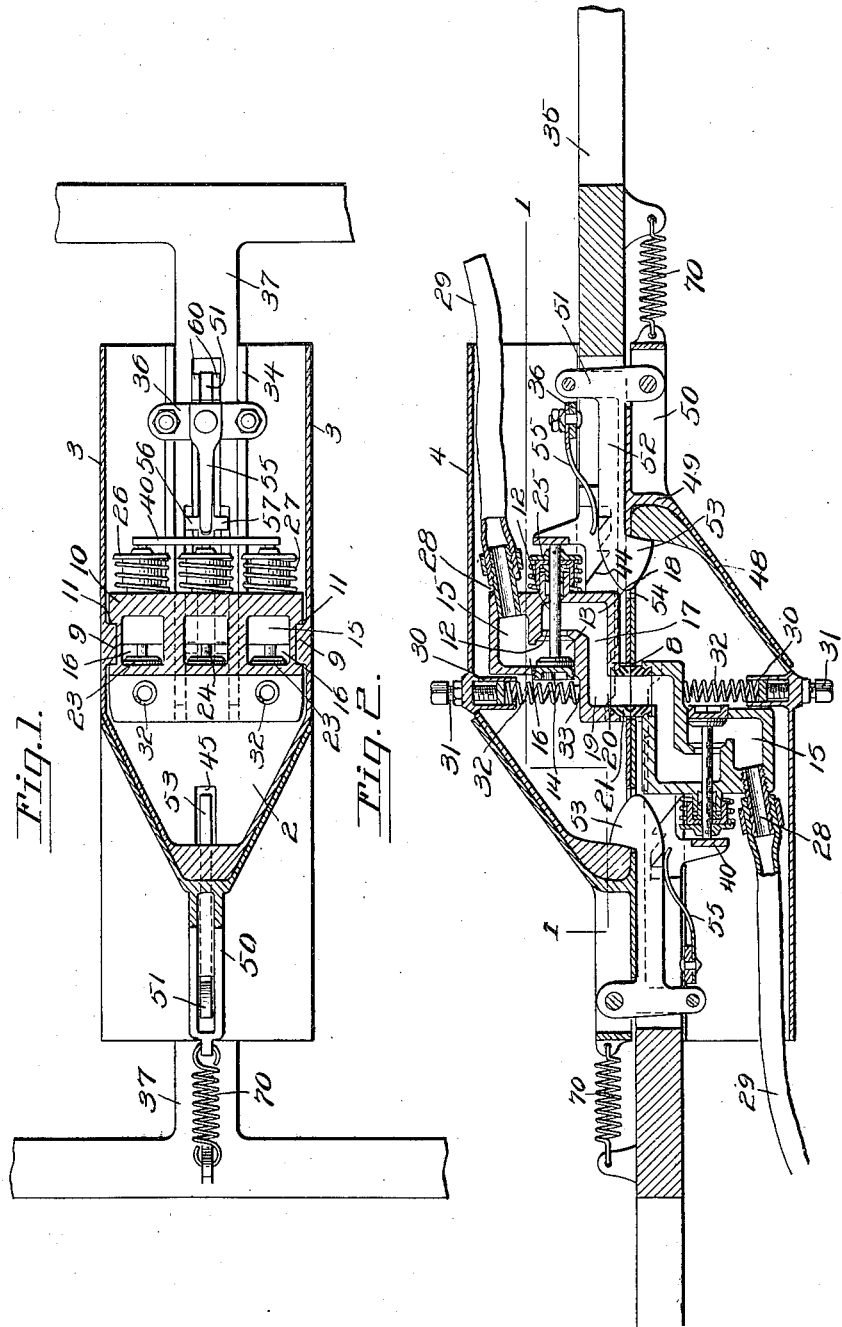

I. A. HARRISON.
COUPLING HEAD.
APPLICATION FILED AUG. 11, 1909.
1,172,989.
Patented Feb. 22, 1916.
6 SHEETS—SHEET 2.
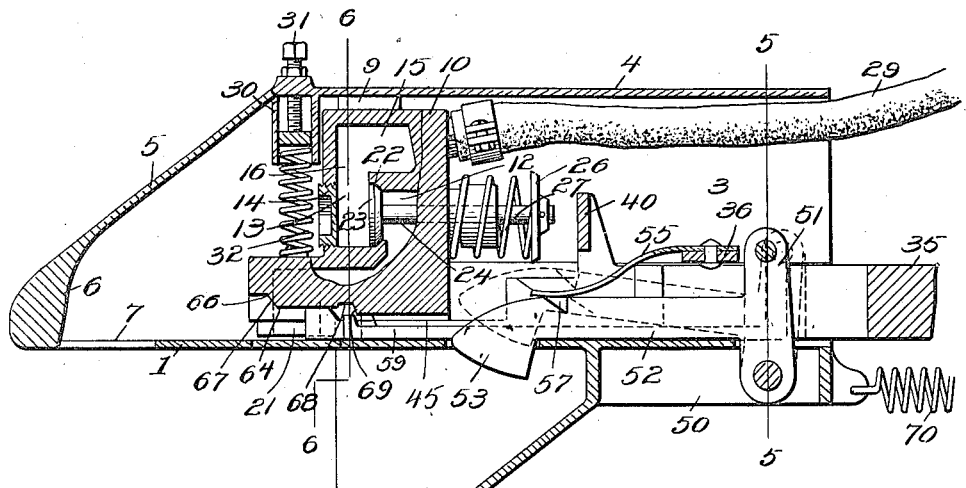
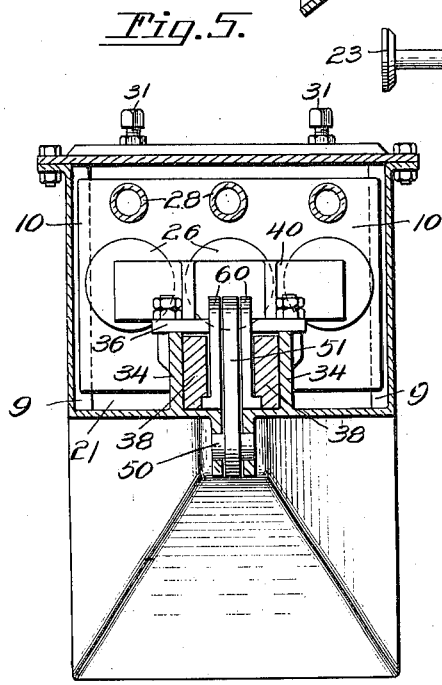
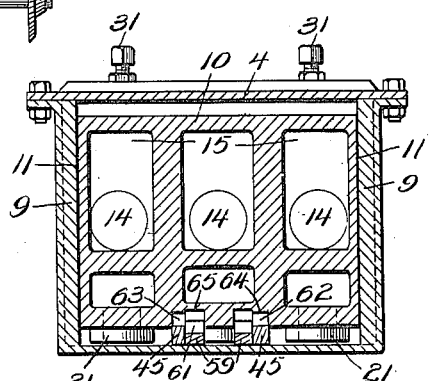
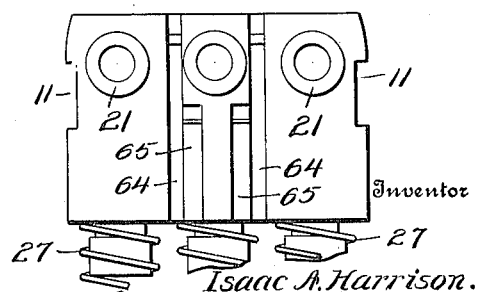
Witnesses
F. C. Gibson.
D. W. Gould.
Inventor
Isaac A. Harrison.
By Victor J. Evans
Attorney

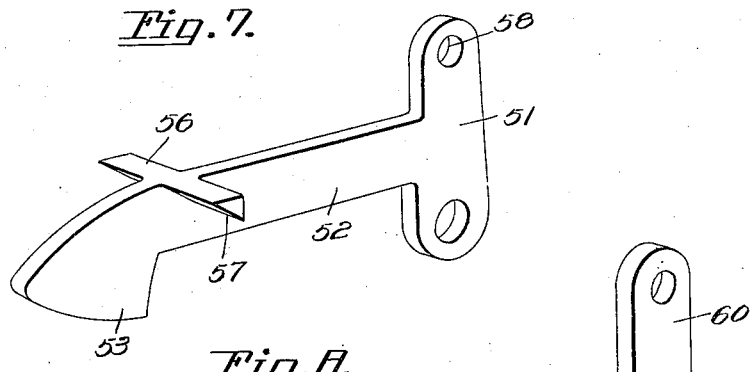
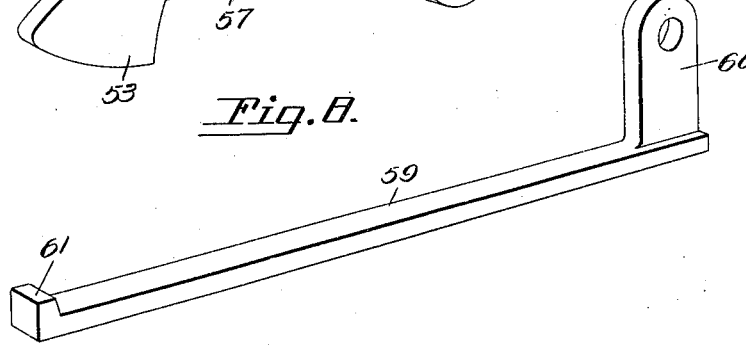
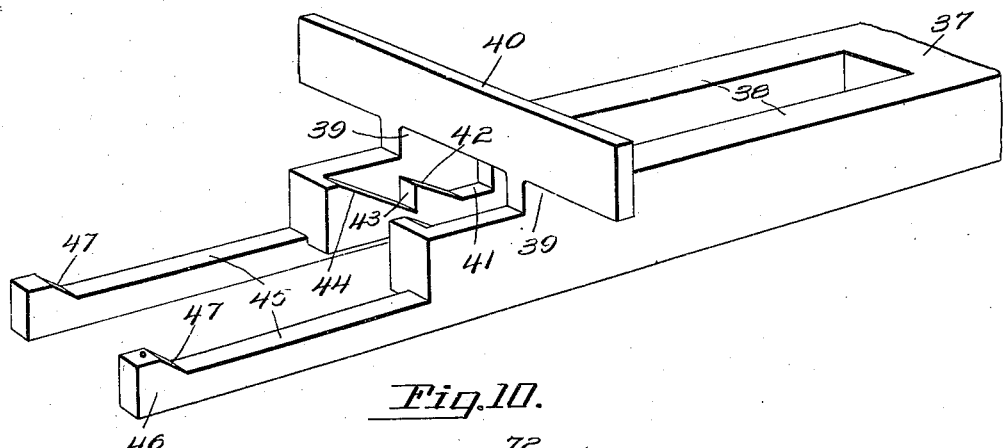
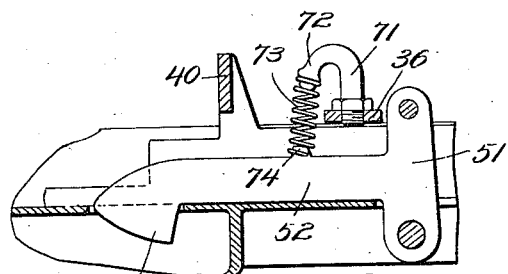

I. A. HARRISON.
COUPLING HEAD.
APPLICATION FILED AUG. 11, 1909.

1,172,989.

Patented Feb. 22, 1916.
6 SHEETS—SHEET 4.

Witnesses
F. L. Gibson.
D. W. Gould.

Inventor
Isaac A. Harrison.
By Victor J. Evans
Attorney

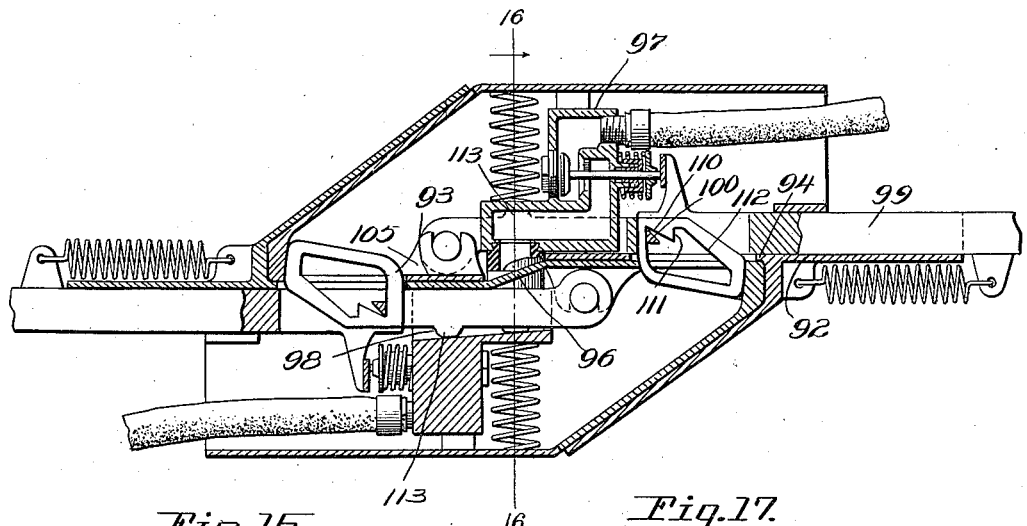
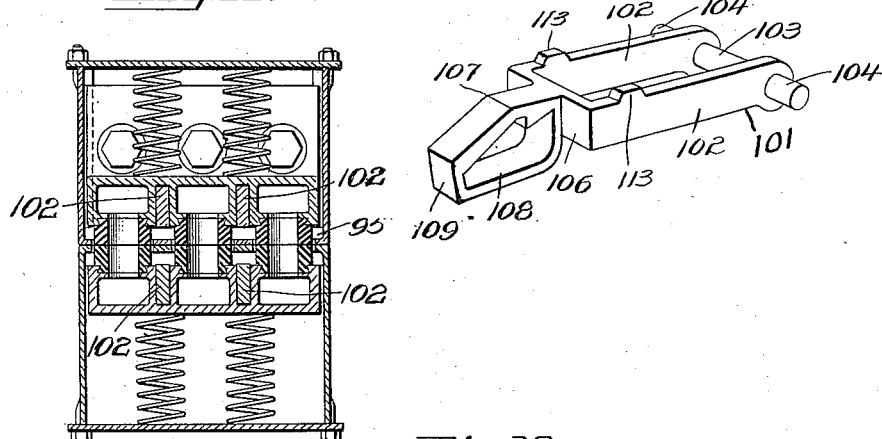
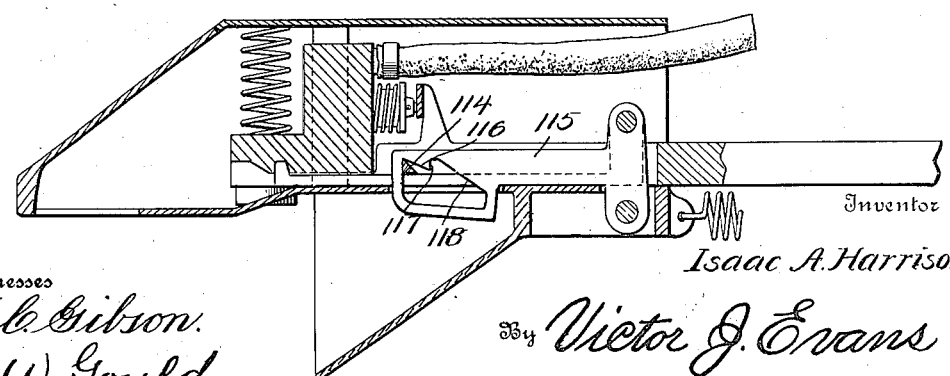

I. A. HARRISON.
COUPLING HEAD.
APPLICATION FILED AUG. 11, 1909.
1,172,989.
Patented Feb. 22, 1916.
6 SHEETS—SHEET 6.
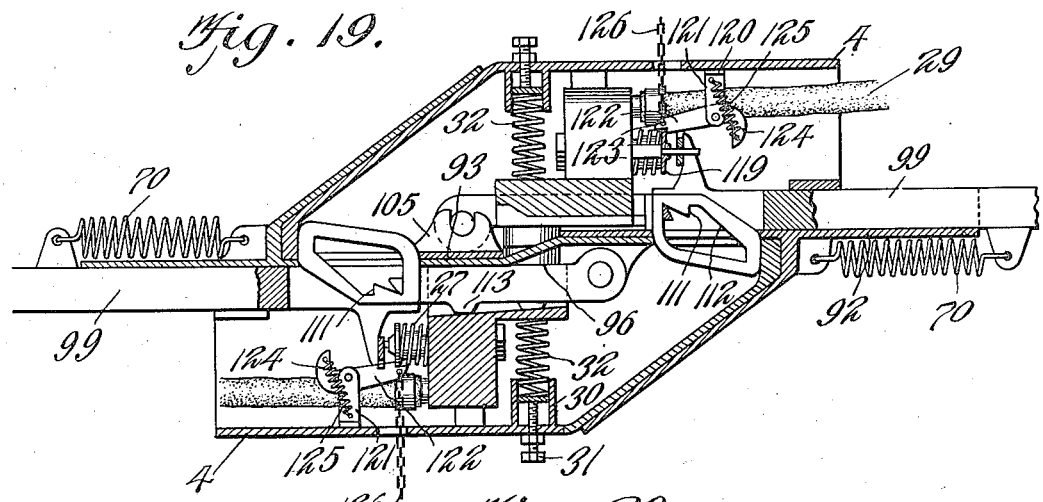
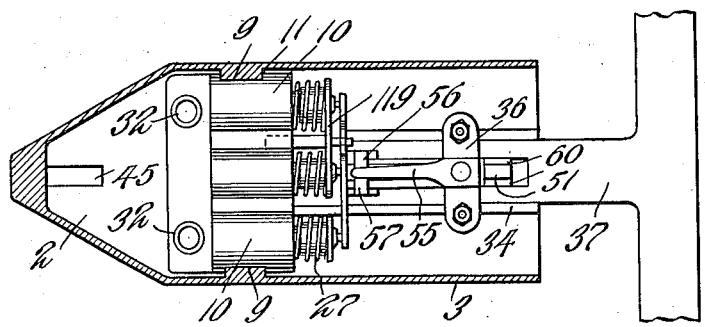
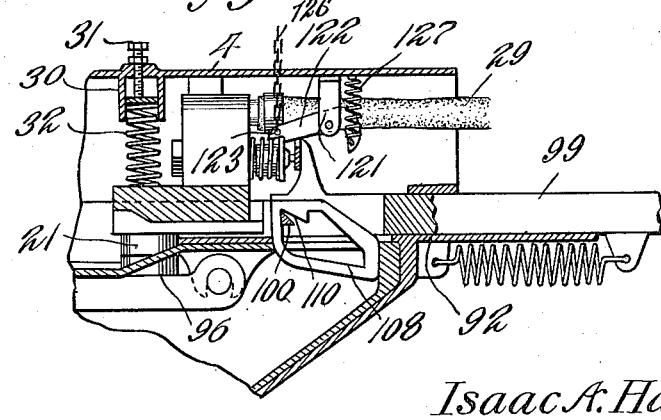
Witnesses
F. C. Gibson
D. W. Gould
Inventor
Isaac A. Harrison
By Victor J. Evans
Attorney

UNITED STATES PATENT OFFICE.

ISAAC A. HARRISON, OF BALTIMORE, MARYLAND, ASSIGNOR OF ONE-HALF TO JOSEPH C. HOWARD, OF BALTIMORE, MARYLAND.

COUPLING-HEAD.

1,172,989.             Specification of Letters Patent.        Patented Feb. 22, 1916.

Application filed August 11, 1909. Serial No. 512,433.

*To all whom it may concern:*

Be it known that I, ISAAC A. HARRISON, a citizen of the United States, residing at Baltimore, in the county of Baltimore City and State of Maryland, have invented new and useful Improvements in Coupling-Heads, of which the following is a specification.

The invention relates to an improvement in coupling heads designed primarily for the automatic connection and disconnection of the steam and air pipes throughout the length of a train.

The main object of the present invention is the provision of a coupling head formed for the automatic connection with or disconnection from a complementary head to unite and form an efficient connection between the air and steam pipes of adjacent cars, the coupling heads operating automatically and without attention in the coupling and uncoupling of the cars.

Another object of the invention is the provision of flexible gaskets forming the terminal of each pipe connection in each coupling head, the gaskets of one head being adapted to be forced into airtight connection with the gaskets of the opposing head when the heads are coupled, the invention including means whereby the gaskets of each head are automatically operated to insure efficient contact in the final coupling of the heads and to prevent contact of said gaskets during the coupling or uncoupling movement of the respective heads, whereby independent movement of the gaskets while in contact and the consequent wear of such parts is avoided.

Another object of the invention is the provision of means whereby in the separation of the coupling heads other than through the manual control of the car couplers, the valves of the respective heads will be automatically locked open, thereby bleeding the train pipes and setting the brakes. This construction is particularly advantageous as it provides for an automatic setting of the brakes in the parting of the train or the separation of a car in accidental or emergency conditions.

The invention will be described in the following specification, reference being had particularly to the accompanying drawings, in which:—

Figure 13:
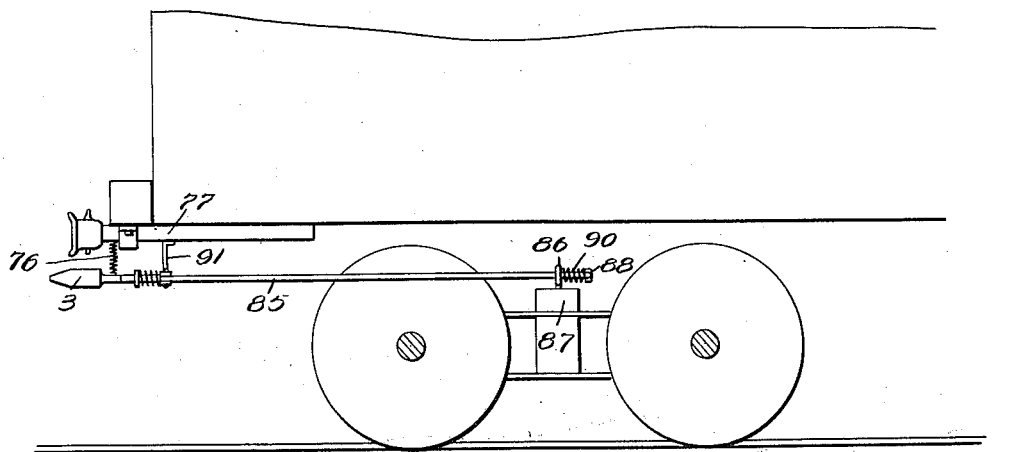
Figure 14:
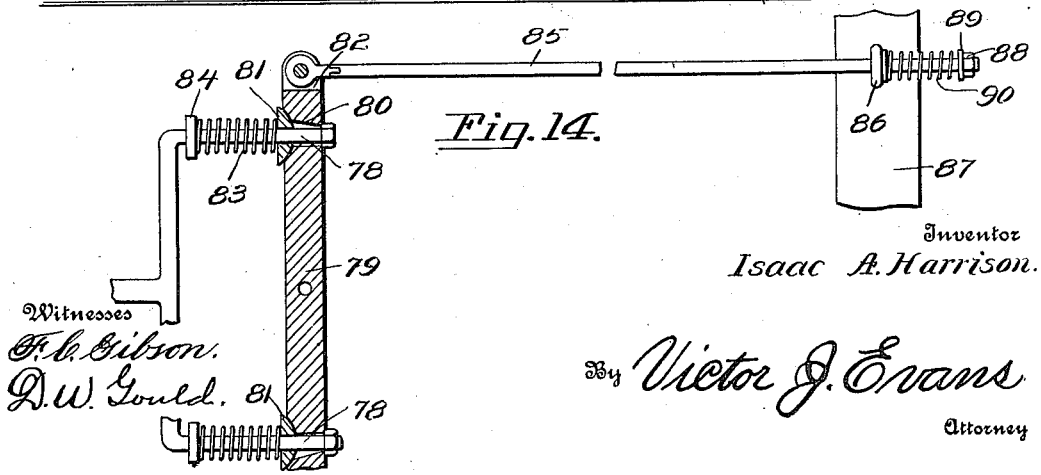

Figure 1 is a vertical section on the line 1—1 of Fig. 2. Fig. 2 is a central horizontal section, partly in elevation, showing both heads coupled. Fig. 3 is a section taken horizontally through one of the heads, the parts being shown in normal or uncoupled position. Fig. 4 is an elevation of one of the valves. Fig. 5 is a section on line 5—5 of Fig. 3. Fig. 6 is a section on line 6—6 of Fig. 3. Fig. 7 is a perspective of the locking lever. Fig 8 is a perspective of one of the locking bars. Fig. 9 is a perspective of the operating slide bar. Fig. 10 is a sectional view illustrating a modified means for tensioning the locking lever. Fig. 11 is a partial side elevation of the valve carrier. Fig. 12 is a bottom plan, showing the connection of the coupling head to the car. Fig. 13 is a side elevation of the same. Fig. 14 is an enlarged broken plan partly in section of the supporting means for the coupling head. Fig. 15 is a horizontal sectional view, illustrating a modified form of structure and showing the coupling heads in coupled positions. Fig. 16 is a section of the same on line 16—16 of Fig. 15. Fig. 17 is a perspective view of the modified form of locking lever used in the modified construction. Fig. 18 is a horizontal sectional view of a coupling head, illustrating another form of locking lever with a modified construction of slide bar to coöperate with the locking lever. Fig. 19 is a view similar to Fig. 15, showing the automatic air valve controlling means. Fig. 20 is a vertical section, taken just beyond the controlling means of Fig. 19. Fig. 21 is a broken view, similar to Fig. 19, showing a slightly different form of valve locking means.

The present invention is directed to providing a coupling head forming a terminal of the steam and air pipes at each end of the car, the construction being such that when the heads are in normal or uncoupled relation particular steam and air pipes are automatically closed, while when the heads of adjacent cars are in coupled relation the cutoff valves of the respective pipes are automatically opened and open communication established between the respective pipes of the adjacent cars. In this connection it is to be understood that the respective heads forming one coupling are of duplicate construction, so that a detailed description of one will suffice for both. Each head comprises a base plate 1, which for the greater portion of its length is of rectangular contour in plan, being formed at its relative forward end in triangular outline, as at 2. The base plate, which is disposed on edge, when in operative position, is provided throughout its top and bottom edges with walls 3, which at an appropriate distance beyond the base plate are connected by a cover plate 4. The walls 3 throughout the length of the triangular portion 2 of the base plate have their outer edges inclined toward the base plate, so that the portion of the cover plate 5 engaging said inclined edges will terminate in a point or nose 6, the end wall, or more properly the continuation of the cover plate, being thickened or otherwise reinforced at this point to afford a substantial bearing for the locking lever to be later described. The base plate 1 immediately adjacent the nose 6 is formed with an elongated opening or slot 7 and in rear of said opening preferably alined with the juncture of the rectangular and triangular portions of the base plate, said base plate is formed with a series of openings 8, which form the outlets for the sealing gaskets, as will presently appear. The openings 8 correspond in number to the number of pipes to be connected and are arranged in alinement transverse the length of the base plate.

In rear of the openings 8 the top and bottom walls 3 of the head are formed or provided with guide ribs 9, arranged in longitudinal alinement and extending throughout the width of the wall and on the relatively inner surface of the same. Slidably mounted on the ribs 9 is what I term a valve carrier 10 comprising a box-like casing having its side walls formed with grooves 11 to receive the ribs 9 and permit independent movement of the carrier to and from the base plate 1, for a purpose which will presently appear.

The carrier, which is an approximately rectangular body, is formed with a series of bores 12 arranged about centrally of the same and in vertical alinement, said bores corresponding in number to the number of pipes to be connected, in the instance shown three. The bores 12 are circumferentially enlarged in their relatively inner portions, as at 13, and are closed at their relatively inner ends by removable plugs 14. Beyond each bore 12 toward the cover plate 4 the carrier is formed in alinement with the bore with a second bore 15, which, at its relatively inner end through an opening 16, communicates with the enlarged portion 13 of the bore 12. The carrier is formed, beyond each bore 12 toward the base plate of the coupling with a third bore 17, which through the medium of an opening 18 communicates with the bore 12 in advance of the enlarged portion 13 of said bore, said bore 17 extending forward and into a carrier extension 19, which is of less width though equal in height to the carrier proper. The bores 17 communicate with passages 20 opening through that wall of the extension 19 adjacent the base plate 1, the said wall of the extension being provided about the outlet from each passage 20 with a sealing gasket 21. The gaskets are preferably secured in the wall of the extension so as to normally project beyond the surface of the wall, the parts being so arranged that the respective gaskets 21 register with the openings 8 in the base plate. The formation of the bore 12, hereinafter termed the valve bore, of two distinct diameters provides a shoulder 22, which is formed to provide a valve seat, it being obvious from the construction described that the bore 15, hereinafter termed the inlet bore communicates with the bore 12 on one side of the valve seat 22, while the bore 17, hereinafter termed the outlet bore, communicates with the valve bore on the opposite side of the valve seat. Movably mounted in each bore 12 and arranged for coöperation with the seat 22 therein is a valve 23, the stem 24 of which extends through the relatively rear wall of the carrier and through a stuffing box 25 secured to said wall. The end of the stem beyond the carrier being provided with a disk head 26, between which and the proximate carrier wall is arranged a coil spring 27 of such tension and so arranged as to normally maintain the valve 23 on its seat 22. The inlet bores are adapted for the insertion of nipples 28 to which are secured the respective air and steam pipes 29, as clearly shown in Figs. 2 and 3.

In the construction of carrier described, it is obvious that with the parts in normal position, in which the valves 23 are closed, the outlet bore is closed against the inlet bore, so that the respective steam and air pipes 29 are effectively closed. Secured to the cover plate 4 in advance of the carrier are sleeve housings 30 in the end walls of which are threaded adjusting screws bearing against the relatively outer terminal of coil springs 32, the opposite end of which engage studs 33 on the outer wall of the carrier extension 19. The springs 32 are so tensioned as to normally maintain the gaskets 21 projected through the openings 8 in the base plate, and to insure an air-tight juncture between opposing gaskets, the adjusting screws 31 providing for maintaining an accurate tension of the springs for this purpose. Movably mounted between guide flanges 34 projecting outwardly from the relatively outer surface of the base plate 1, near the rear edge thereof, is a slide bar 35, a bridge member 36 being secured to the free edges of the flanges to prevent independent outward movement of the slide. The slide comprises a main bar 37 which in the relatively forward portion is divided to form spaced parallel bars 38. At a point in advance of the guide flanges 34 each bar 38 is formed with an outward extension 39, which extensions are provided at their free or outer ends with a pressure bar 40. The bar 40 is thus arranged transversely of the slide bar and is of greater length than the height of said bar, the pressure bar being designed to simultaneously engage and exert pressure upon the ends of the valve stems 24 in the operation of the parts. Immediately in advance of the pressure bar 40 each bar 38 is cutaway on its relatively inner surface to reduce the thickness of the bar, the relatively outer edge of said cutaway portion being formed to provide immediately beneath the pressure bar a squared portion or shoulder 41, extending in parallel relation to and spaced inwardly from the proximate edge of the bar 38. In advance of the shoulder 41 the edge of the cutaway portion is inclined outwardly, as at 42, terminating at its forward end in an abrupt shoulder 43 extending at right angles to the outer edge of the bar 38, said edge of the cutaway portion being in advance of the shoulder 43 inclined outwardly from said shoulder, as at 44, the relatively forward end of the inclined portion 44 terminating in coincidence with the outer or free edge of the bar 38. Immediately in advance of the forward end of the inclined portions 44 the bars 38 are reduced in thickness and width and projected to form guide bars 45, the forward ends of which terminate in blocks 46, which are of greater width though of similar other dimensions with the guide bars 45. The projecting portions of the blocks 46 extend outwardly beyond the surface of the bars 45, the juncture between the projecting portions of the blocks and the guide bars forming an inclined shoulder 47, all as clearly shown in Fig. 9. The relatively inner surface of the base plate 1 in rear of the openings 8 therein is formed with a nose housing 48, arranged in opposition to the similarly formed portion 5 on the opposite or outer side of the base plate. The housing 48 is designed to receive the nose 6 and portion 5 of the complementary coupling head, and, therefore, opens toward the relatively forward end of the base plate. Projecting rearwardly from the nose portion 49 of the housing 48 are spaced flanges 50, between which near their rear ends is pivotally mounted a cross bar 51 of a locking lever 52. The cross bar 51 extends outwardly through an opening in the base plate so as to dispose the main length of the locking lever on the relatively outer surface of the base plate. The cross bar 51 projects between the spaced bar 38 of the slide, and the locking lever projects forwardly between said bars and terminates in a hook end 53 designed to project through an opening 54 in the base plate immediately in rear of the carrier 10, a leaf spring 55 being secured to the bridge piece 36 with its free end bearing upon the locking lever, so as to normally maintain the hook end 53 of said lever projected through the opening 54 in position to engage the nose end 6 of the complementary head, the lever in this operation passing through the slotted openings 7 in the complementary head, as clearly shown in Fig. 2. The locking lever, which is more particularly seen in Fig. 7, is provided on its relatively outer edge immediately in rear of the hook end 53 with a lifting bar 56, the relatively inner surface of which on the respective sides of the locking lever is inclined, as at 57, for coöperation with the respective inclined surfaces 42 and 44 of the bars 38, for a purpose which will presently appear. The relatively outer end of the cross bar 51 of the locking lever extends beyond the proximate surfaces of the bars 38, and pivotally connected at 58 to said end of the cross bar are locking bars 59. These bars 59, which are elongated strips of metal, are each provided at their rear ends with ears 60 to provide for their pivotal connection to the cross bar 51 of the locking lever, their forward ends terminating in blocks 61, which project beyond the relatively outer surfaces of the bars, for a purpose which will presently appear. As seen in Fig. 5 it will be noted that the locking lever is centrally disposed between the respective bars 38 of the slide, and between said lever and each bar 38 there is arranged one of the locking bars, which extend forwardly and rest against the relatively outer surface of the base plate.

The carrier 10 is formed in that surface next the base plate 1 with two spaced channels 62 and 63. These channels are designed to receive and permit independent movement of the guide bars 45 of the slide and of the locking bars 59 arranged between said guide bars. Each channel is formed to provide independent guiding surfaces 64 and 65, said guiding surfaces forming the relatively outer or base wall of the channel. The guiding surface 64 is designed to receive the guide bar 45 operating in the channel, the forward end of said surface 64 being cutaway at 66 to provide for the reception of the block 46 on the end of the guide bar 45, the juncture between the cutaway portion 66 and the surface 64 being inclined, as at 67, so that in the relatively rearward movement of the guide bar the coöperation of the inclined surfaces 47 of said bar and 67 of the channel will induce an outward movement of the carrier. As will presently appear in the description of the operation it will be noted that the movement of the blocks 46 against the guiding surfaces 64 constitute the initial movement of the parts in the uncoupling operation under the pull exerted on the operating slide bars 37, and that by this movement the blocks 46 will, as the first operation of the parts, force the valve carrier outwardly with relation to the base plate 1 of each head and thereby effectively disengage the respective gaskets of the head, the initial movement of the slide bars also withdrawing the pressure bar 40 and permitting the valves to close. The guide surface 65, which is of less length than the guide surface 64 is also cutaway at its outer end at 68 to receive the head 61 on the forward end of one of the locking bars 59, the cutaway portion 68 having an inclined rear surface 69 to coöperate with a similar surface on the block 61, for a purpose which will presently appear.

The respective guide surfaces, cutaway portions thereof, and blocks 47 and 61 carried by the slide and locking bars, are so arranged that when said blocks are in the cutaway portions the springs 32 engaging the carrier will operate to force said carrier toward the base plate and thereby project the sealing gaskets 21 through the openings 8 in said base plates, but that when the heads 46 or 61 or either of them are engaged with the guiding surfaces 64 or 65 of the channels, the carrier will be forced outwardly from the base plate against the tension of the springs 32 and while in such position will, of course, maintain the respective gaskets 21 withdrawn through the openings 8 to avoid possibility of the gaskets of one head frictionally engaging the gaskets of the other head during any and all operations of the parts while the heads 46 and 61 are in such holding positions. The slide bar 35 is connected by a spring 70 with the relatively rear ends of the guide flanges 50, the spring being tensioned to normally maintain the slide bar in the forward or operative position. With the parts of the respective coupling heads arranged as described, the operation in the act of coupling is as follows, it being understood that prior to such operation the lifting bar 56 of each locking lever rests in advance of and directly against the shoulder 43 on the coöperating slide bar, in which position the slide is positively held withdrawn from operative position and the blocks 46 on the forward ends of the guide bars 45 of the slide bar are engaged with the guiding surfaces 64 of the channels so as to maintain the valve carrier in inoperative position to hold the sealing gaskets withdrawn. The pressure bar 40 is also withdrawn from contact with the valve stems so that the valves of each carrier are closed.

As the nose end 6 of the opposing heads ride into the respective housings 48 each base plate at the nose end of the coupler, which is slightly rounded as shown, will engage the rounded forward end of the hook 53 of each locking lever. As the heads advance to coupling position the engagement described gradually forces each locking lever outward relative to the base plate by which it is carried, the movement being continued until the hook end of each of said locking levers rides into the slot 7 of the relatively opposing heads. As the hook end of each locking lever is gradually forced outward by the nose end of the opposing head, the upper end of the cross bar 51 of said lever is gradually moved in a rearward direction. This movement of the upper end of the cross bar 51 will move the locking bars 59 of each head in a rearward direction so as to dispose the blocks 61 of said locking bars beneath and in contact with the guide surfaces 65 of the channels, in which position it will be understood that said locking bars will lock the valve carriers in inoperative position wholly independent of the position of the blocks 46 of the guide bars 45. The relatively outward movement of the hook ends of the locking levers is continued until the lifting bars 56 of said levers are disengaged from the shoulders on the slide bars, this disengagement occurring just preceding the reverse movement of the locking levers to engage the slots of the opposing heads. Immediately the slide bars are freed from engagement with the locking levers the springs 70 operate to induce a relatively forward movement of the slide bars, which movement causes the pressure bars 40 to engage and open the valves, at the same time disposing the blocks 46 carried by guide bars in position to coöperate with the cutaway portions 66 of the guide surfaces 64. In this position the blocks 46 are so disposed as to permit a free movement of the valve carrier to dispose the gaskets in sealing position, but said movement of the carrier is as yet prevented as the locking bars 59 are still withdrawn so that the blocks 61 thereof support the valve carrier in inoperative position. Immediately succeeding the described movement of the slide bar, however, the hook ends of the locking levers engage the slots of the opposing heads, locking said heads together, the engaging movements of the locking levers operating to move the locking bars 59 forwardly so that the blocks 61 thereof engage the cutaway portion 68 of the guide surfaces 65, thereby permitting the movement of the valve carriers to operative positions to insure a sealing coöperation between the gaskets of the respective carriers. It is, of course, understood that the operations of the slide bar and locking levers to operative positions are almost simultaneous so that the valves are opened momentarily prior to the movement of the carrier to engage the gaskets in sealing positions, the momentary difference in operation being designed to insure that all parts of the respective heads be in coupling positions prior to the movement of the carriers to project the gaskets. In other words it is to be distinctly noted that the movement of the gaskets into sealing positions is the final operation of the parts, so that there is no possibility of any sliding contact between the gaskets of the opposing heads. With the parts in operative or coupled positions the lifting bar 56 of the locking levers rests upon the plane portions 41 of the slide bars, as clearly shown in Fig. 2 of the drawings. In the uncoupling operation, which is also automatic, the pull being exerted upon the respective slide bars will initially induce a movement of said bars independent of the movement of any other part, the lifting bars 56 of each locking lever riding on the plane portions 41 of the slide bars. This initial movement of the slide bars operates to withdraw the blocks 46 from the cutaway portions 66 of the valve carriers and move said blocks into engagement with the guiding surfaces 64 of the channels, thereby serving to force the valve carriers outwardly relative to the respective base plates and disengage the gaskets of the respective heads from their contact. The initial movement of the slide bar will, of course, withdraw the pressure bar from engagement with the valves, permitting said valves to close. Thereby, in the initial and first movement of the parts in the uncoupling operation, the respective valve carriers are forced apart to disengage their gaskets and close the valves. As the pull continues on the slide bars the inclined portions 42 of said bars will engage the lifting bars 56 of each locking lever and gradually elevate the hook end of said lever to disengage it from the slot 7 of the opposing head. The relatively rearward movement of the slide bar is continued causing the lifting bars 56 to ride up the inclines 44 of the slide bars and elevate the hook end of the respective locking levers to completely release the opposing heads, whereupon the heads are free for separation. Immediately succeeding the release of the pull on the slide bars the springs 70 tend to return said bars to normal position, but the spring 55 has meanwhile forced the locking levers toward operative position, so that as the slide bars advance the lifting bars 56 of the locking levers will ride into and engage the shoulders 43 of the slide bars, holding the slide bars withdrawn from complete operative position against the tension of the spring 70. With the slide bars in this position, as shown in full lines in Fig. 3, it will be noted that the pressure bar 40 is out of contact with the valves so that the valves are closed, and also that the blocks 46 of the slide bars are engaged with the guide surfaces 64 beyond the cutaway portion 66 whereby the valve carriers are held in normal or outward position with their gaskets withdrawn.

As the initial feature of the operation it is to be particularly noted that in the coupling operation the final movement of the parts is that which permits the movement of the valve carriers to a position to cause engagement of the sealing gaskets of the respective heads, and in the uncoupling operation the first or initial movement is that which withdraws the valve carriers to disengage the gaskets of the respective heads. By this operation it will be seen that in the coupling operation the gaskets are not moved toward each other until all possible relative movement of the respective heads has been accomplished and in the uncoupling operation the gaskets are separated from each other before there is any possibility of relative movement of the heads. Such relative movement of the heads in the coupling and uncoupling operation cannot therefore by any means affect the gaskets so far as inducing a frictional movement of these parts is concerned. Therefore, the wear on the gaskets incident to a sliding contact is absolutely prevented and the gaskets are always in condition to provide a fluid tight juncture between the heads.

In Fig. 10 I have shown a slightly modified form of spring for operating the locking levers, wherein the bridge piece 36 of the supporting flanges 34 is provided with a rod 71 threaded therein, which rod has an inwardly turned terminal 72 designed to receive and engage one end of a coil spring 73, the opposite end of which is designed to bear on the locking lever 52 preferably engaging a stud 74 projecting therefrom.

In Figs. 12 and 14 inclusive I have shown a means for supporting the coupling head from the car, in which the slide 35 is provided at its rear end with a cross extension 75, and in advance of said extension is connected to the lower terminal of a coil spring 76, the upper terminal of which is connected to the draw bar 77 of the ordinary coupling. The ends of the cross section 75 are drawn rearwardly to provide parallel arms 78, each of which passes through a connecting bar 79. The openings 80 in said connecting bar for the terminals of the arms 78 are of materially greater diameter than the diameter of said arms, the relatively outer wall of each of the openings 80 being inclined outwardly and forwardly, whereby to permit an independent movement of the parts. Each arm 78 is provided with a bearing block 81 having a semispherical or rounded rear surface, designed to seat in the recess 82 in the forward portion of the connecting bar 79 about the openings 80, a spring 83 encircling the arm in advance of the block 81 and bearing between said block and a stop 84 fixed on the arm, the end of the connecting bar beyond the connection of the arms 78 thereto are pivotally connected to rods 85, having universal joints immediately adjacent their connection with bar 79, said rods extend rearwardly and are projected through eyes 86 carried on the adjacent truck bolster 87, the rear terminals of the rod having nuts 88 and washers 89, between which washers and the eye 86, or a washer encircling the rod 85 adjacent the eye, is arranged a coil spring 90. The connecting bar is centrally and pivotally supported on a rod 91, depending from the draw bar of the usual coupler, upon which such connecting bar is free for turning or independent vertical movement. The improved head will thus automatically adapt itself to the swinging action of the cars, or permit a higher or lower position as when one car may be more heavily loaded than the adjacent car. The respective springs operate to maintain the head in proper position centrally of the car the connections between the arms 78 and the bar 79 and said bar and the bolster 87 permitting such movement of the particular coupling head as will insure the maintenance of the coupling between the pipes in the swinging of a car about a curve or the like, all of which is clearly shown in Fig. 12 of the drawings.

In Figs. 15, 16, and 17 I have shown a modified form of arrangement in which the gaskets are normally in projected or sealing position, the parts being so arranged that the gaskets are automatically withdrawn from such sealing position and maintained in such withdrawn position during the coupling and uncoupling operation of the heads. In this form of the invention I dispense with several of the parts shown and described in connection with the preferred form, thereby eliminating the cost and complication incident to such parts.

In the form being described the head is practically identical with that described in the preferred form, except that in the modified form the base plate, herein denoted by 92 is formed in distinct offset portions, the relatively forward portion 93 thereof being in a plane inwardly with relation to the opposing head beyond the rear portion 94. The openings 95 in the base plate corresponding to the openings 8 in the preferred form are arranged in the inclined web 96 which connects the proximate ends of the relatively offset portions of the base plate, all as clearly shown in Figs. 15 and 16. The valve carrier 97 of the modified form is practically identical with that of the preferred form, except that in the relatively inner surface of said carrier there is formed spaced parallel channels 98, the relatively outer wall of which inclines outwardly from the inner or forward end of the carrier toward the rear end, as clearly shown in Fig. 15. The operating slide bar 99 in the modified form is approximately similar to that in the preferred form except that said bar is not provided with the guide bars 45 and in place of the operating shoulders and planes for the lifting bar of the locking lever, the slide bar is formed with a transverse bar 100, designed to coöperate with the locking lever to be later described.

The essential element of novelty in the modified form is the locking lever 101, Fig. 17. This lever comprises spaced parallel bars 102, which at their relatively forward ends support a rod 103 arranged to project beyond the relatively outer sides of the respective bars to form trunnions 104. The respective bars 102 are so spaced that when the locking lever is in place said bars will rest in the channels 98 in the valve carrier, as clearly shown in Fig. 15. The trunnions 104 of the lever are rotatably mounted in half-bearing blocks 105 secured to the base plate immediately in advance of the valve carrier, so that with the valve carrier removed the locking lever may be freely lifted from the bearings. Rearwardly beyond the valve carrier the bars 102 of the lever are connected by a cross bar 106 and centrally of the cross bar there is arranged a rearwardly projecting hook end 107, the lower surface of which inclines downwardly from the relatively lower plane of the bars 102, as at 108, the rear end of the hook 107 forming an abutment 109 designed when the lever is in locking position to bear against the thickened portion 6 of the nose of the opposing lever, as shown in Fig. 15. The hook end 107 is of skeleton form and the relatively upper wall of the opening within said portion is formed at its rear end with a downward incline 110 and in advance thereof with a shoulder 111, the surface in advance of the shoulder being downwardly inclined, as at 112. The opening of the hook end 107 is designed to embrace the cross bar 100 carried by the operating slide bar 99, so that in the movements of the lever said bar will engage the various surfaces and shoulders formed in the upper wall of the opening. The relatively outer edge of each of the bars 102 is formed with an offset or projection 113, which is so arranged that when the bars are in the channels 98 the projections 113 will engage the relatively outer walls of said channels in alinement with the springs for forcing the valve carriers to operative position, which springs are identical with those in the preferred form.

In operation the heads of the modified construction approach each other as in the preferred form, it being noted, however, that owing to the offset portions of the base plate the relatively inner portions 93 of said plates will contact and as the heads approach each other will engage and force the respective hook ends of the locking levers outward. This movement of the levers will force the valve carriers outward and so withdraw the gaskets from the sealing position. The valve carriers cannot return to normal position until the respective heads are so disposed as to permit the hooks of each locking lever to ride through the recess 7 of the opposing head, and as the respective heads are in coupled position at this time it will be obvious that the gaskets are moved to operative or sealing positions only after the heads are fixed with relation to each other. In the uncoupling operation the initial movement of the slide bars incident to the pull thereon will cause the cross bars 100 to travel down the inclines 110 of the respective locking lever, thus initially withdrawing the gaskets from sealing position, the movement being continued until the cross bar 100 engages the incline 112 of each lever and fully withdraws the lever from locking position. The initial separating movement of the heads will, owing to the offset bases, effectively separate the base plates at the inclined webs 96, thereby effectively preventing contact of the gaskets in the return of these parts to normal or sealing position. Upon release of the pull the slide bar 99 returns to a position in which the bar 100 is in engagement with a notch 111, permitting a full projection of the hook end of the locking lever through the openings 7 in the particular head and yet preventing engagement of the pressure bar of the slide bar with the valve stems.

In Fig. 18 I have shown the preferred form of head except that the base plate is offset as in the form shown in Fig. 15, and the locking lever 115 is of skeleton form at the hook end, a cross bar 114 carried by the operating slide bar being arranged to coöperate with inclined surfaces 116, shoulders 117 and inclined surfaces 118, with the operation of parts substantially identical with that described in connection with the preferred form.

The invention so far described is designed particularly for the automatic coupling and uncoupling of the air brake, signal, and steam pipes between cars of a train, contemplating, of course, the manual uncoupling of the cars under the usual operations of the train men. In this event, of course, it is desired that the air and steam pipes be automatically cut off when the cars are disconnected, and the apparatus described is admirably adapted to this end. It is appreciated, however, that under certain circumstances it is highly desirable that the air brake and signal pipes at least remain open after the separation of the cars. For example in the event of an unforeseen parting of the train or the derailment of a car, or other accident tending to break a coupler, it is essential that the air brake and signal pipes remain open after the air coupling heads have separated, in order to sound the signal and bleed the train pipe. I have devised a construction to accomplish this result, which is shown particularly in Figs. 19, 20, and 21.

Referring particularly to Figs. 19 and 20, the stems 24 of the valve closing the ports leading to the air pipes connected by the coupler are united for simultaneous operation by a tie plate 119, so that these two valves move uniformly. Secured to the cover plate 4 of each coupling head at a point immediately in rear of the valves are bracket members 120 having depending arms 121 arranged in spaced parallel relation and extending inwardly from the cover plate. Between said arms, at their relatively inner ends, is pivotally mounted a locking dog 122, which in advance of the pivot is straight and formed on the relatively inner edge at the forward end with a notch or shoulder 123. Rearwardly beyond the pivot the dog is curved, as at 124, and the terminal of the curved portion is connected to the upper end of one of the arms 121 by means of a coil spring 125. The parts are so constructed that in the normal position of the dog the connection of the spring thereto is beyond alinement with the pivot of the dog and the connection of the other end of the spring, this fact being equally true in the operative position of the dog, so that the spring tends to hold the dog in either position. The tie plate 119 rides against the relatively inner edge of the dog, and the latter is of such length that under the movement of the pressure bar 40 the tie plate will be moved into such position to be engaged by the shoulder 123, so that the dog will thereby lock the valves in open position independent of the pressure plate. A flexible connection 126 extends from the shouldered end of the dog through the cover plate of the coupling head and to the lever by which the car coupler is controlled, so that in operating said lever to uncouple the cars the chain 126 will be drawn upon to withdraw the dog from engagement with the tie plate, or an independent operating means may be used for this purpose, if desired.

In the operation of this particular feature it will be understood that the dog in normal position will, as the heads couple, engage the tie plate and so lock the air valves open. Now as the particular car is manually uncoupled the dog is withdrawn from the operative position and moved into the inoperative position, and as the coupling heads separate, as previously described, the valves will close through action of their springs, the rearward movement of the pressure bar of the slide 37 engaging the curved end of the dog and restoring it to operative position. Therefore, when the cars are manually uncoupled the valves are permitted to close. If, however, there is an emergency parting of the car couplers, the coupling heads of this invention will separate, but as the dog is in engagement with the tie plate it is obvious that the air valves will remain open, sounding the alarm and bleeding the train pipe to set the brakes.

In Fig. 21 I have shown the automatic lock as adapted for those cars carrying the automatic uncoupling lever which, after initial operation, returns to normal position. In this form the dog 122, which is identical in all particulars with that previously described, is connected by a spring 127 with the cover plate 4, the connection of the spring to the cover plate and to the dog being on the same side of the pivot of the dog. In this form the dog is always held in operative position by the spring, so that the operation of the automatic uncoupling lever simply relieves the valves from the dog connection during the uncoupling of the cars and the dog immediately returns to an operative position for the next operation. Accidental uncoupling of the cars, however, has the same effect as in the previously described form. The automatic lock shown in Fig. 21 is further advantageous in that it prevents unauthorized persons from operating the uncoupling lever while the cars are separated and so setting the dog in inoperative position.

The salient feature of the present invention resides in the provision of coupling pipes of cars, the sealing gaskets, which in themselves alone serve to maintain a fluidtight juncture between the heads, being adapted for such operation independent of the movement of the heads as will cause a contact between said gaskets only at the moment necessary to prevent leakage of the fluid, the respective gaskets being maintained separated during the entire independent movement of the heads in coupling and uncoupling. By this arrangement any frictional or sliding contact of the gaskets is absolutely prevented and the wear of the gaskets incident to such movement avoided. The coupling is thus maintained in perfect relation as the gaskets are not subjected to the least wear and will at all times maintain a fluidtight juncture between the heads.

Having thus described the invention what is claimed as new, is:—

1. A coupling head including a sealing gasket, means for locking said head with a complementary head, and means to operate the gasket for movement to sealing position wholly succeeding the operation of the locking means.

2. A coupling head including a sealing gasket, means operating said gasket, said means normally operative for movement in a direction to release the gasket, and means for interlocking said head with a complementary head, said interlocking means being adapted to hold the gasket operating means against the normal operation thereof.

3. A coupling head including a valve carrier, means for supporting the carrier, a fluid channel formed in the carrier, a gasket forming the outlet end of the channel, a valve normally closing the channel, and means operative in the coupling movement of the head to release the carrier supporting means and open the valve.

4. A coupling head including a valve carrier formed with a fluid channel, means for operating the carrier in one direction, a valve normally closing said channel, a gasket encircling the outlet end of the channel, and means for permitting operation of the carrier operating means and simultaneously operating the valve in the coupling movement of the head.

5. A coupling head including a valve carrier formed with a fluid channel, a valve normally closing said channel, a gasket encircling the outlet end of the channel, means for forcing the carrier to arrange the gasket in sealing position relative to the complementary head, and means for supporting the carrier against the influence of its operating means.

6. A coupling head including a valve carrier formed with a fluid channel, a gasket encircling the outlet end of the channel, springs for operating the carrier in one direction, and means for operating the carrier against the tension of said springs to withdraw the gasket from sealing position.

7. A coupling head including a valve carrier formed with a fluid channel, a gasket encircling the outlet of the channel, means for moving the carrier in a direction to arrange the gasket in sealing position, means for interlocking the head with a complementary head, and means controlled by the interlocking means for operating the carrier to maintain the gasket withdrawn from sealing position.

8. A coupling head comprising a casing, a valve carrier movable therein and formed with a fluid channel, a gasket encircling the outlet of the channel, a locking lever carried by the head, and means operated in the movement of the lever to support the carrier to maintain the gasket withdrawn from sealing position.

9. A coupling head including a valve carrier formed with a fluid channel, a gasket encircling the outlet of the channel, and a locking lever to engage a complementary head, said lever being provided with means to support the carrier to maintain the gasket withdrawn from sealing position.

10. A coupling head comprising a casing, a valve carrier movable therein, a locking lever pivoted in the casing, a slide bar engaged by the lever, and projections carried by the lever to engage and operate the carrier to position the gasket relative to sealing position.

11. A coupling head comprising a casing, a valve carrier movable therein and formed with a fluid channel, a gasket encircling the outlet of the channel, a locking lever, and means carried by the lever and operable in the movement thereof to operate the carrier and gasket with regard to its sealing position.

12. A coupling head comprising a casing, a valve carrier movable therein and formed with a fluid channel, a valve arranged in said channel, a locking lever pivotally mounted in the head, a slide bar, valve operating means carried by the slide bar, and means integral with the lever to operate the carrier to move the gasket from sealing position.

13. A coupling head including a casing, a valve carrier movable in the casing and formed with a fluid channel, a valve normally closing said channel, a slide bar supported in the casing, means for operating the slide bar in one direction, a locking lever mounted in the casing and arranged to normally hold the slide bar against the influence of its operating means, a valve pressure bar carried by the slide bar and normally free of contact with the valve, and means carried by the lever to operate the carrier and gasket.

14. A coupling head including a casing, a valve carrier movable in the casing and formed with a fluid channel, a valve normally closing said channel, a slide bar supported in the casing, means for operating the slide bar in one direction, a locking lever mounted in the casing and arranged to normally hold the slide bar against the influence of its operating means, a valve pressure bar carried by the slide bar and normally free of contact with the valve, and blocks carried by the lever to normally engage and operate the carrier and gasket.

15. A coupling head including a casing, a valve carrier movable in the casing and formed with a fluid channel, a valve normally closing said channel, a slide bar supported in the casing, means for operating the slide bar in one direction, a locking lever mounted in the casing and arranged to normally hold the slide bar against the influence of its operating means, a valve pressure bar carried by the slide bar and normally free of contact with the valve, said carrier being formed with channels, and blocks projecting beyond the surfaces of the lever and moving in the channels to engage and operate the carrier.

16. A coupling head comprising a casing, a valve carrier guided for movement in the casing and formed with a series of fluid channels, a valve normally closing each channel, a gasket encircling the outlet from each channel, a slide bar movable in the casing, a locking lever pivotally mounted on the casing, and blocks carried by the lever to engage and operate the carrier.

17. A coupling head including a sealing gasket and valves, a slide bar, means carried by said bar to operate the valves, means for operating the bar in a direction to open the valves, and a locking lever to engage a complementary head, said lever being adapted to normally maintain the slide bar in position to prevent its operation of the valves.

18. A coupling head including a series of valves, a slide bar arranged to operate the valves, a locking lever arranged to engage the complementary head, and means carried by the lever to engage and hold the slide in position to prevent its influence upon the valves.

19. A coupling head including a series of valves, a slide bar arranged to operate the valves, a locking lever arranged to engage the complementary head, means carried by the lever to engage and hold the slide in normal position, and means to operate the slide to open the valves in the movement of the locking lever to disengage the slide holding means.

20. A coupling head including a gasket arranged for sealing coöperation with a complementary head, a locking lever to engage the complementary head, and means operated by said lever for maintaining the gasket withdrawn from sealing position during movement of the lever.

21. A coupling head including a gasket arranged for sealing coöperation with a complementary head, means for forcing said gasket to sealing position, a locking lever carried by the head to engage the complementary head, and means operated by said lever for maintaining the gasket in withdrawn position against said gasket-forcing means.

In testimony whereof I affix my signature in presence of two witnesses.

ISAAC A. HARRISON.

Witnesses:
   Jos. H. Thomas,
   Hazel Harrison.